United States Patent
Yi et al.

(10) Patent No.: US 10,813,125 B2
(45) Date of Patent: Oct. 20, 2020

(54) METHOD AND APPARATUS FOR SUPPORTING BACKHAUL SIGNALING MECHANISM FOR NEW RADIO ACCESS TECHNOLOGY IN WIRELESS COMMUNICATION SYSTEM

(71) Applicant: LG Electronics Inc., Seoul (KR)

(72) Inventors: Yunjung Yi, Seoul (MD); Kijun Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/312,938

(22) PCT Filed: Jun. 26, 2017

(86) PCT No.: PCT/KR2017/006708
§ 371 (c)(1),
(2) Date: Dec. 21, 2018

(87) PCT Pub. No.: WO2017/222355
PCT Pub. Date: Dec. 28, 2017

(65) Prior Publication Data
US 2019/0335495 A1 Oct. 31, 2019

Related U.S. Application Data

(60) Provisional application No. 62/354,115, filed on Jun. 24, 2016.

(51) Int. Cl.
*H04W 4/00* (2018.01)
*H04W 72/14* (2009.01)
(Continued)

(52) U.S. Cl.
CPC .......... *H04W 72/14* (2013.01); *H04B 7/0617* (2013.01); *H04L 5/0007* (2013.01); *H04W 72/1247* (2013.01)

(58) Field of Classification Search
CPC ........ H04B 7/024; H04B 7/0413; H04B 7/06; H04B 7/0617; H04L 1/0003;
(Continued)

(56) References Cited

U.S. PATENT DOCUMENTS 8,761,074 B2 * 6/2014 Blankenship ........ H04B 7/2606
370/315
9,100,149 B2 * 8/2015 Park ...................... H04B 7/155
(Continued)

FOREIGN PATENT DOCUMENTS

WO  WO 2010/103048  * 9/2010
WO  2014/109580  7/2014
WO  2015/131920  9/2015

OTHER PUBLICATIONS

Ghosh, LTE-Advanced: Next-Generation Wireless Broadband Technology, IEEE, 13 pages, Jun. 2010.*
(Continued)

*Primary Examiner* — Frank Duong
(74) *Attorney, Agent, or Firm* — Fish & Richardson P.C.

(57) ABSTRACT

A method and apparatus for supporting a backhaul signaling in a wireless communication system is provided. A first transmission and reception point (TRP) receives a dynamic indication from a second TRP via backhaul signaling, and handles priorities of usage scenarios according to the dynamic indication. The dynamic indication may include at least one of a subframe type, downlink/uplink (DL/UL) configuration, an intended transmission/reception (TX/RX) burst length, a gap length, blank resources, scheduling information for all or specific user equipments (UEs), a numerology used in a resource set, or information on data forwarding.

13 Claims, 13 Drawing Sheets

(51) Int. Cl.
*H04B 7/06* (2006.01)
*H04L 5/00* (2006.01)
*H04W 72/12* (2009.01)

(58) Field of Classification Search
CPC ... H04L 5/0007; H04L 5/0092; H04L 5/1469; H04L 27/26; H04L 27/2602; H04W 16/14; H04W 72/0426; H04W 72/12; H04W 72/1215; H04W 72/1247; H04W 72/14; H04W 88/06
See application file for complete search history.

(56) References Cited

U.S. PATENT DOCUMENTS

| | | |
|---|---|---|
| 10,383,011 B2 * | 8/2019 | Berglund ............ H04W 36/023 |
| 2012/0069790 A1 | 3/2012 | Chung et al. |
| 2014/0139372 A1 | 5/2014 | Soel et al. |
| 2015/0063200 A1 | 3/2015 | Seo et al. |

OTHER PUBLICATIONS

Wang et al, Joint Downlink Cell Association and Bandwidth Allocation for Wireless Backhauling in Two-Tier HetNets With Large-Scale Antenna Arrays, IEEE, 18 pages, May 2016.*

* cited by examiner

[Fig. 1]
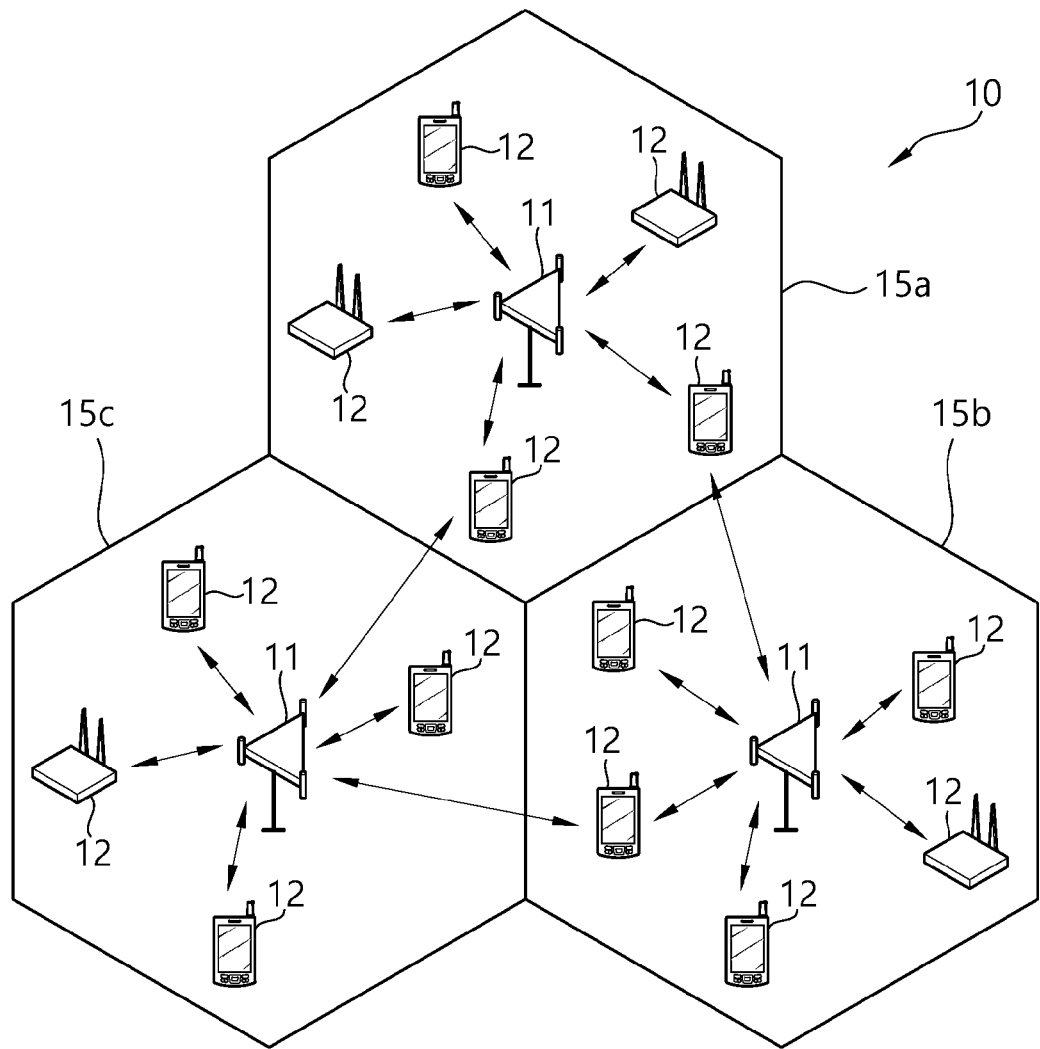
[Fig. 2]
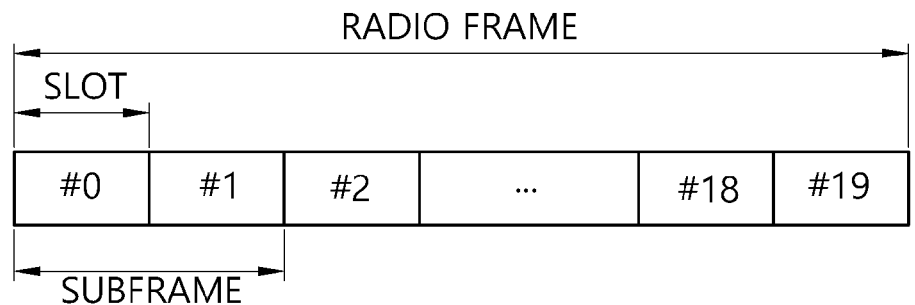

[Fig. 3]
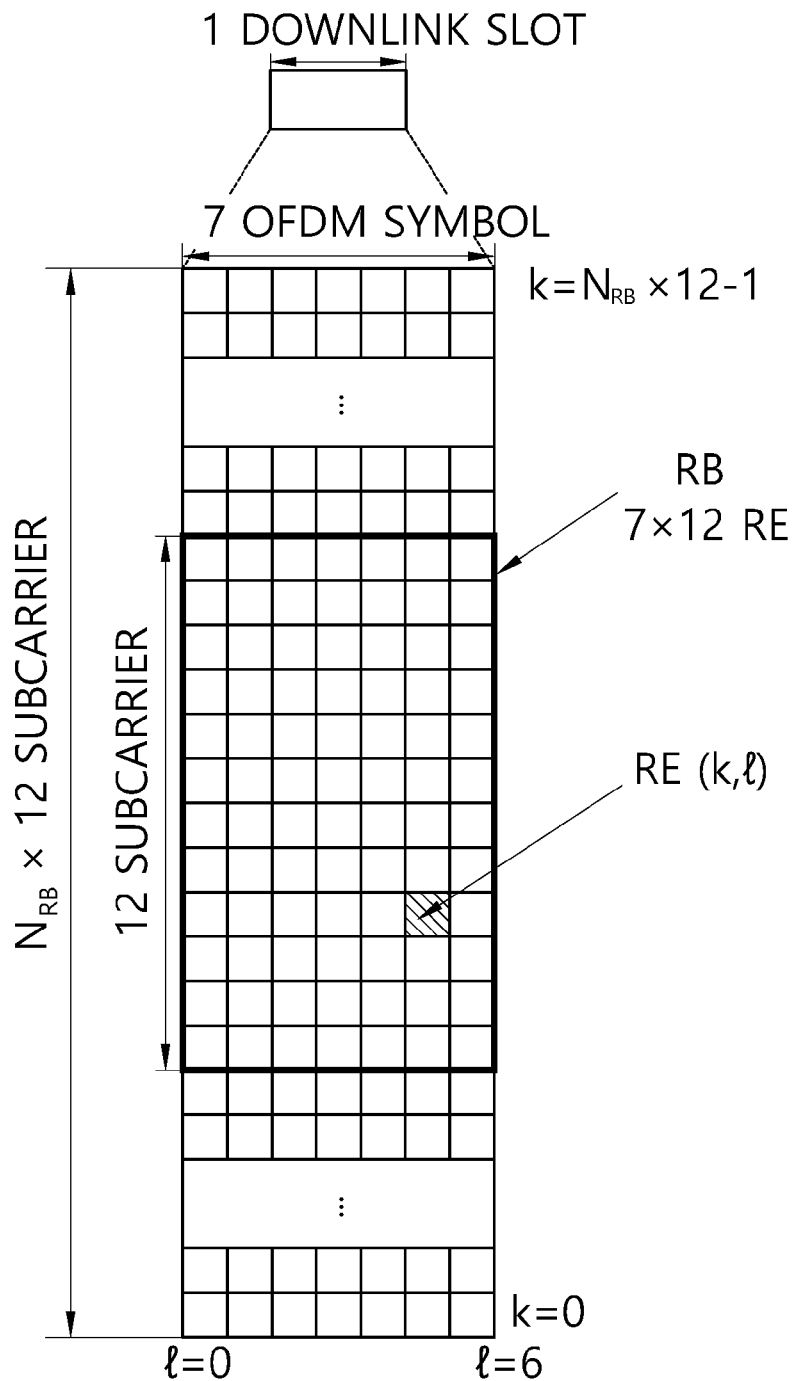

[Fig. 4]
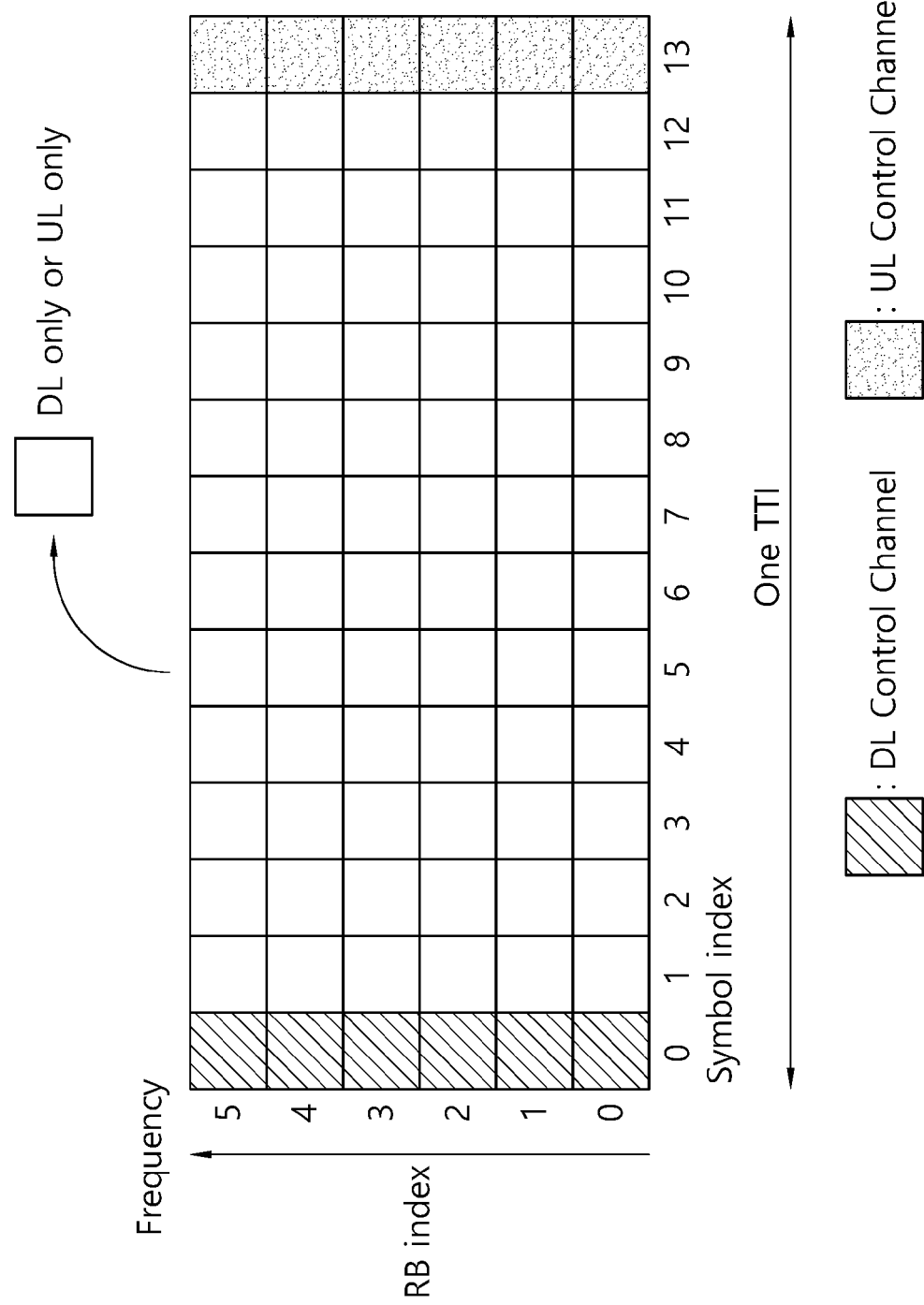

[Fig. 5]
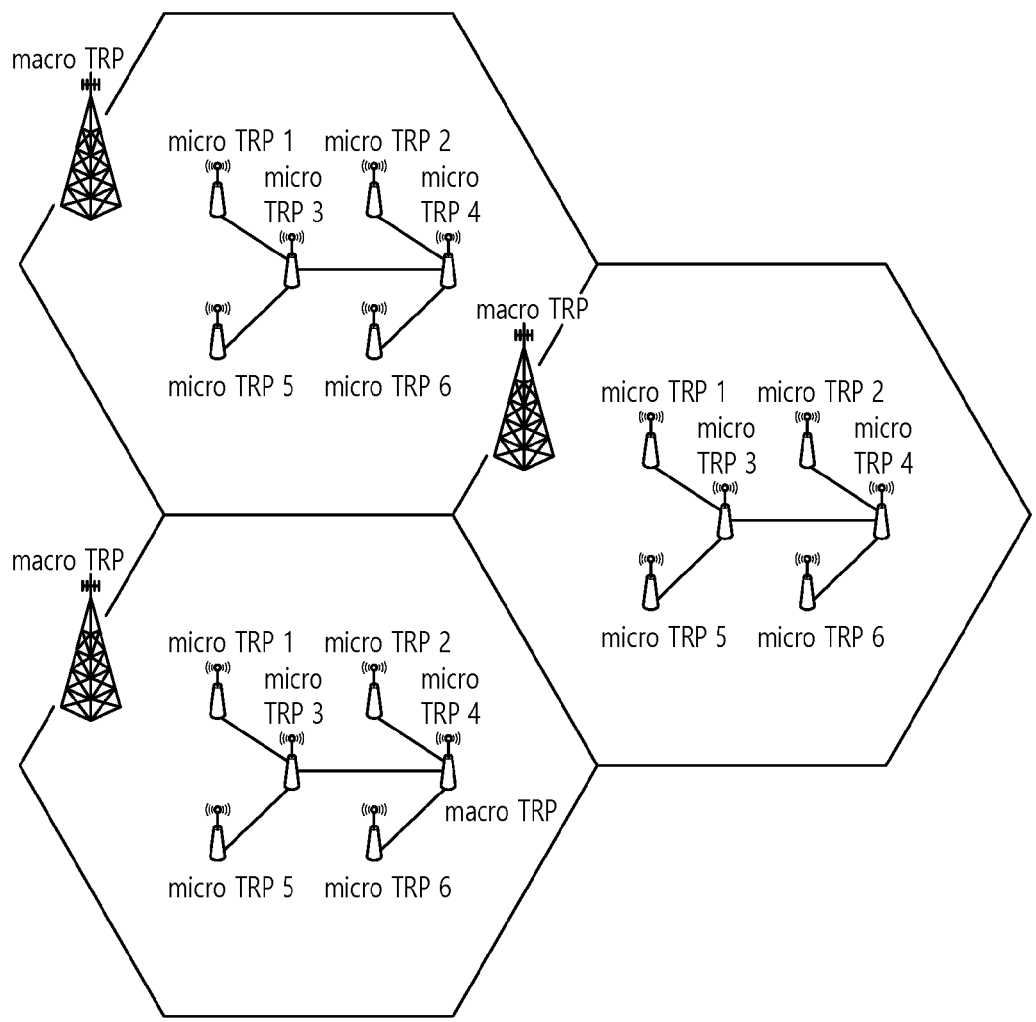

[Fig. 6]
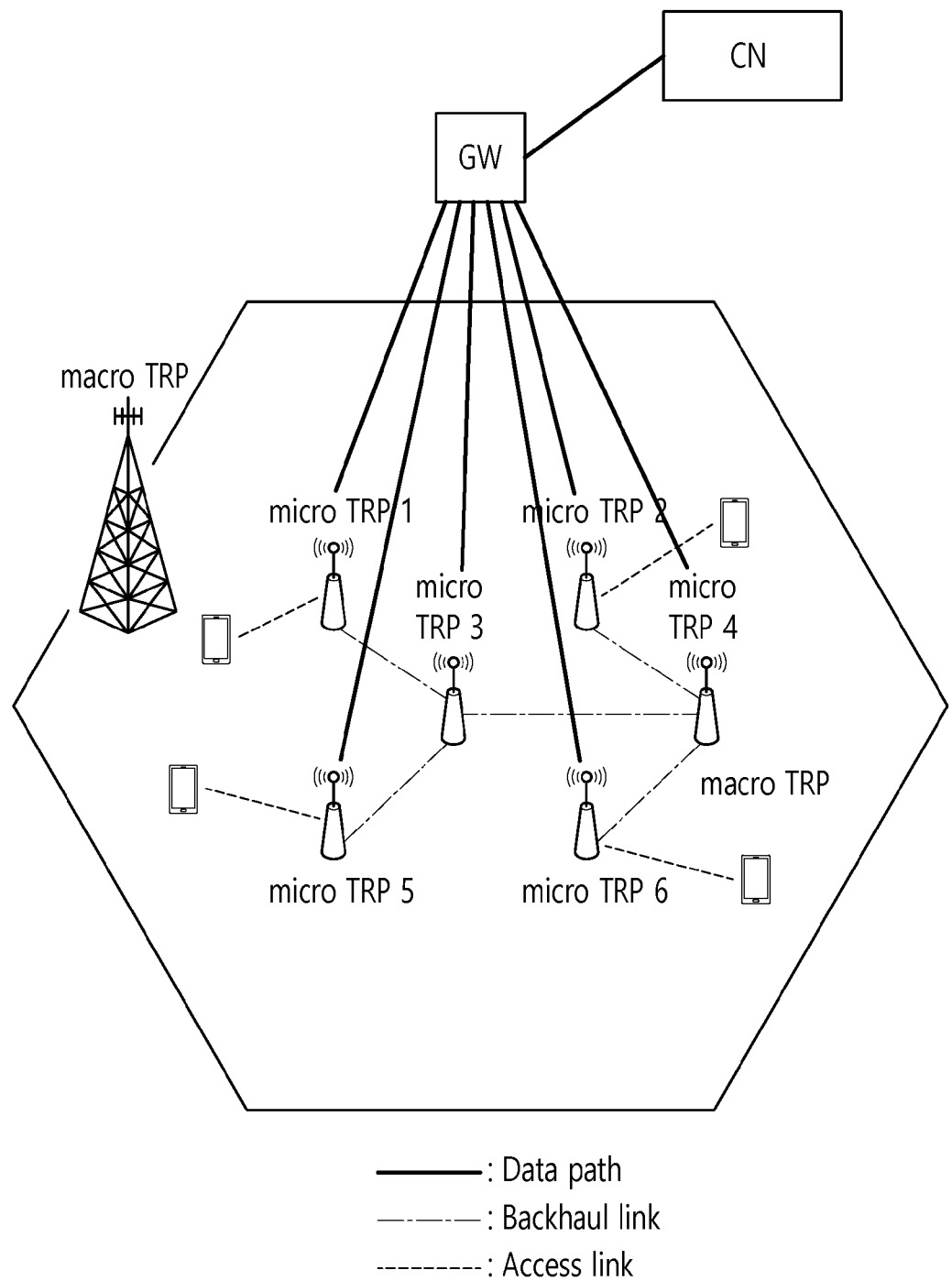

[Fig. 7]
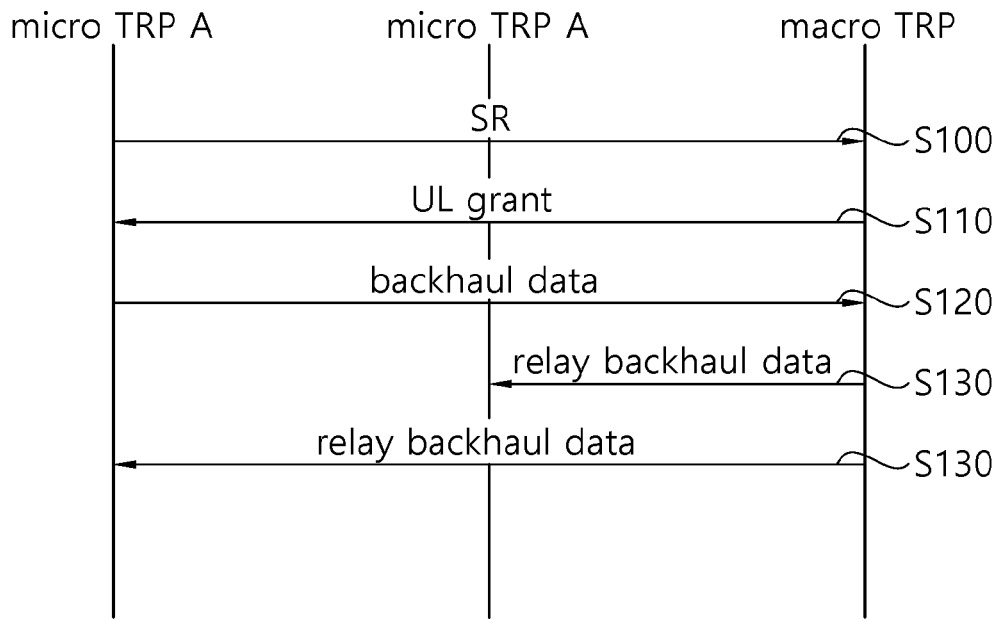
[Fig. 8]
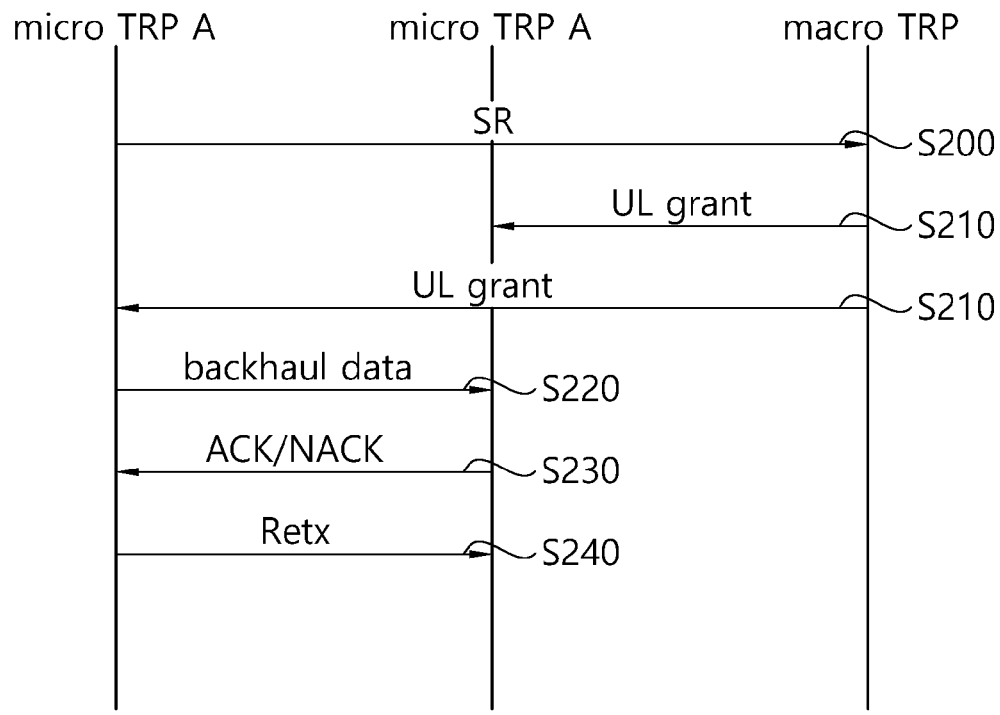

[Fig. 9]
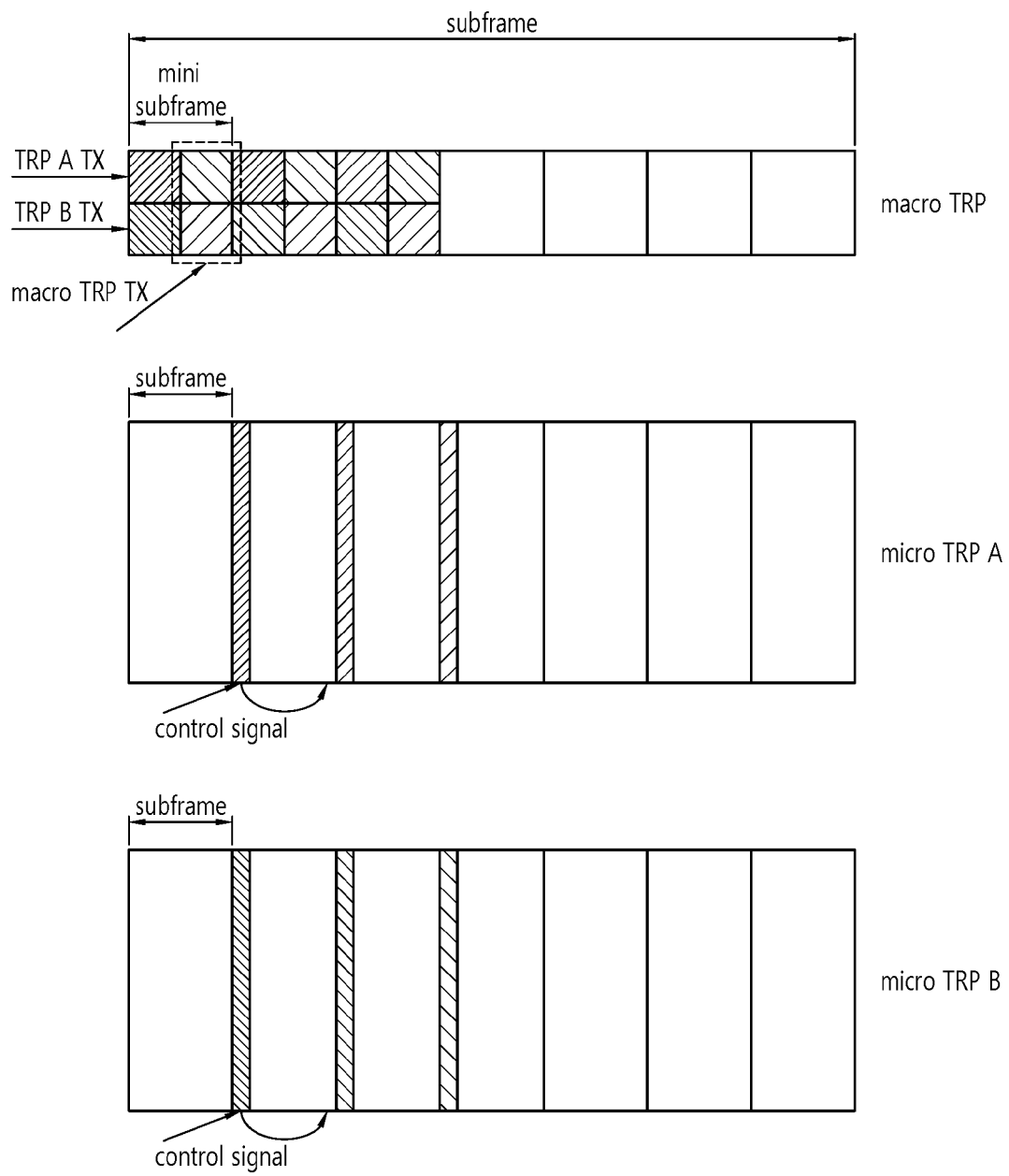

[Fig. 10]
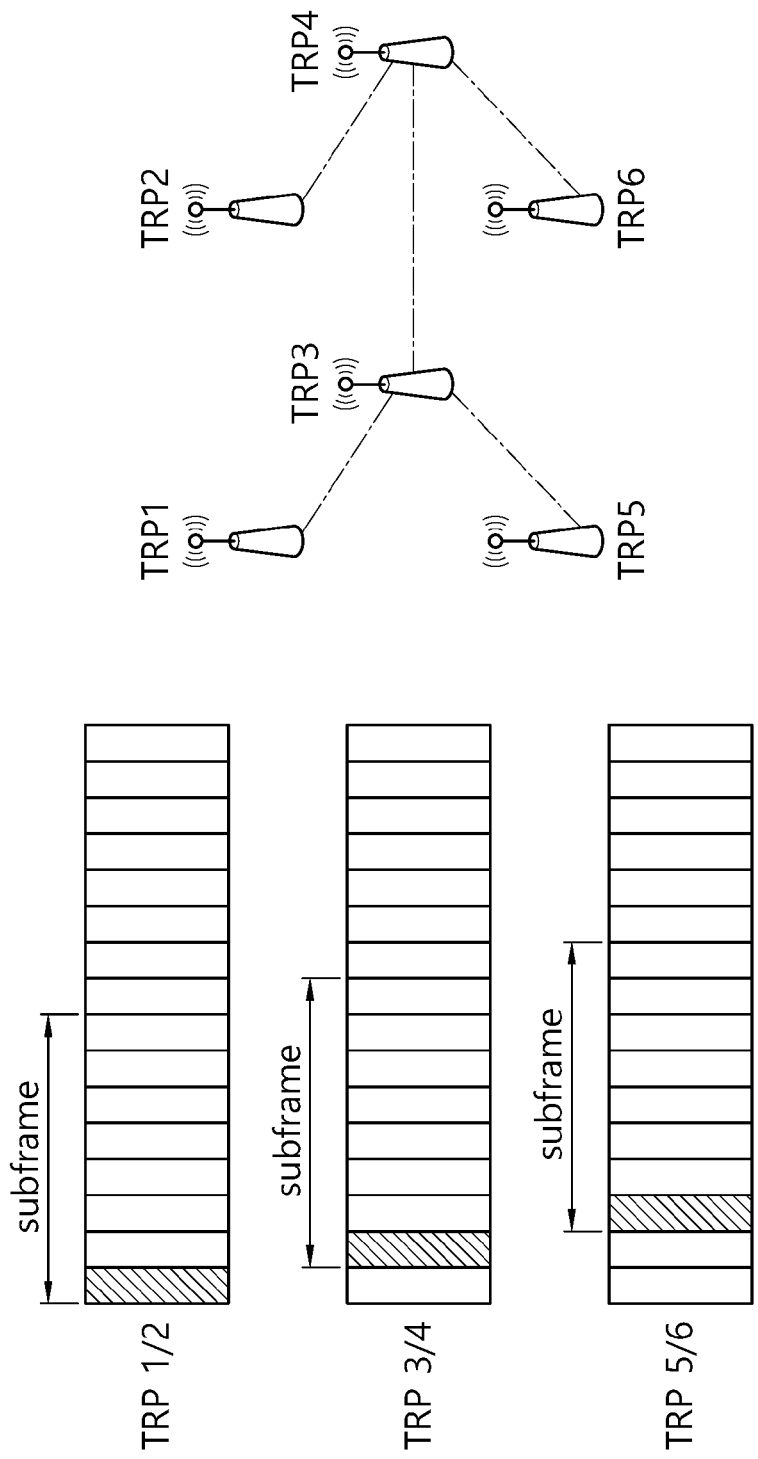

[Fig. 11]
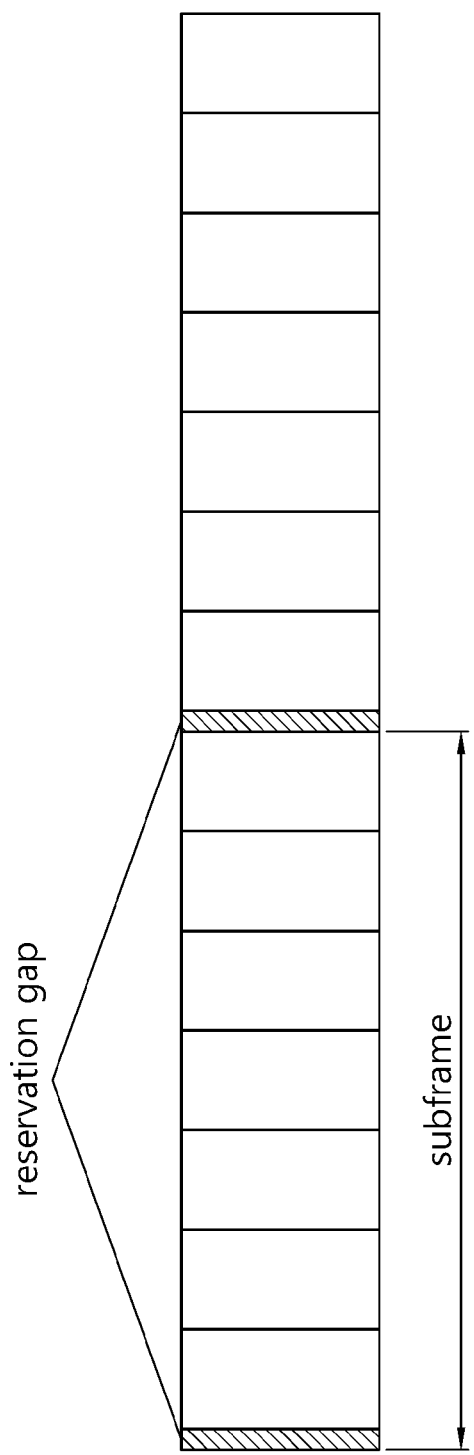

[Fig. 12]

[Fig. 13]
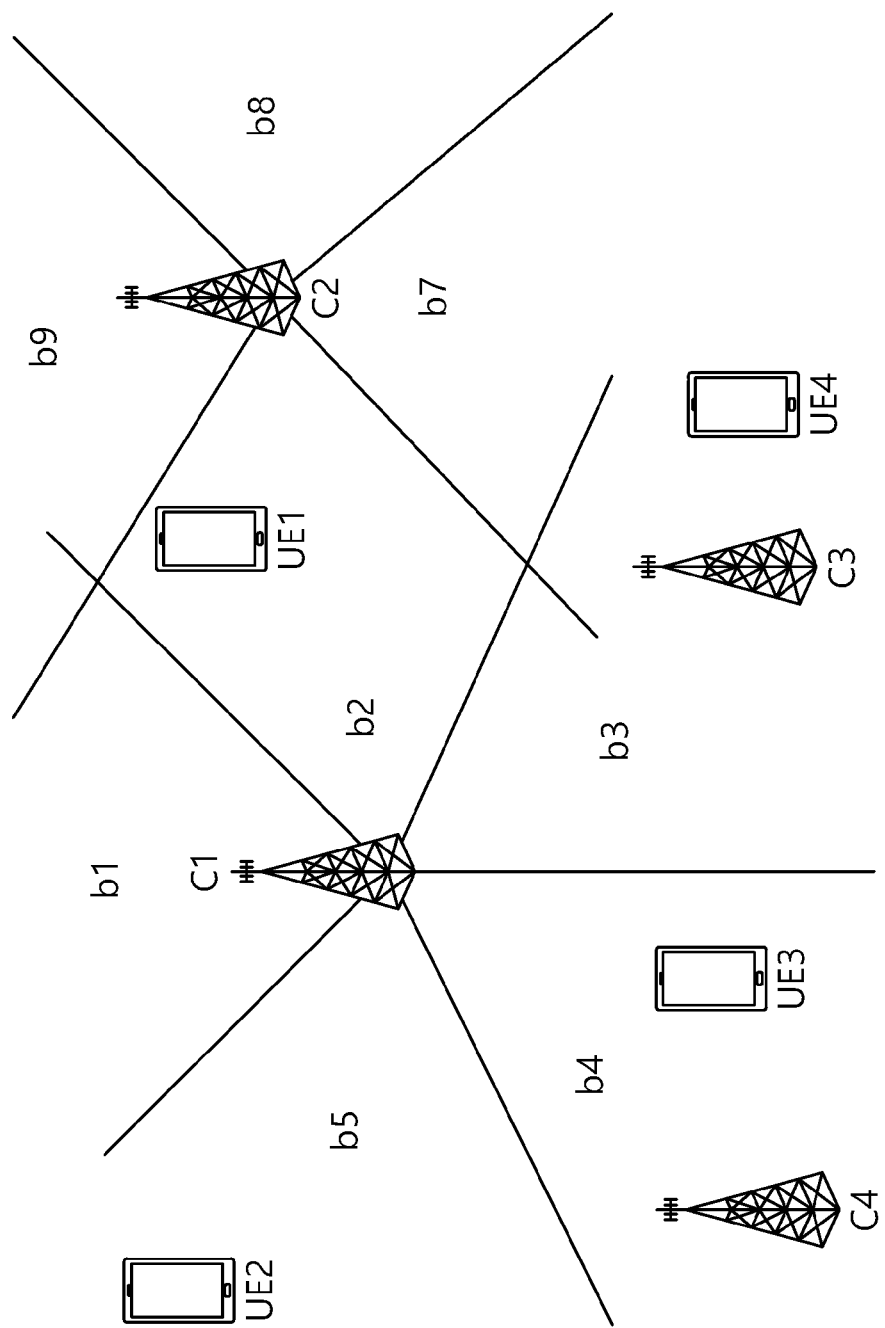

[Fig. 14]
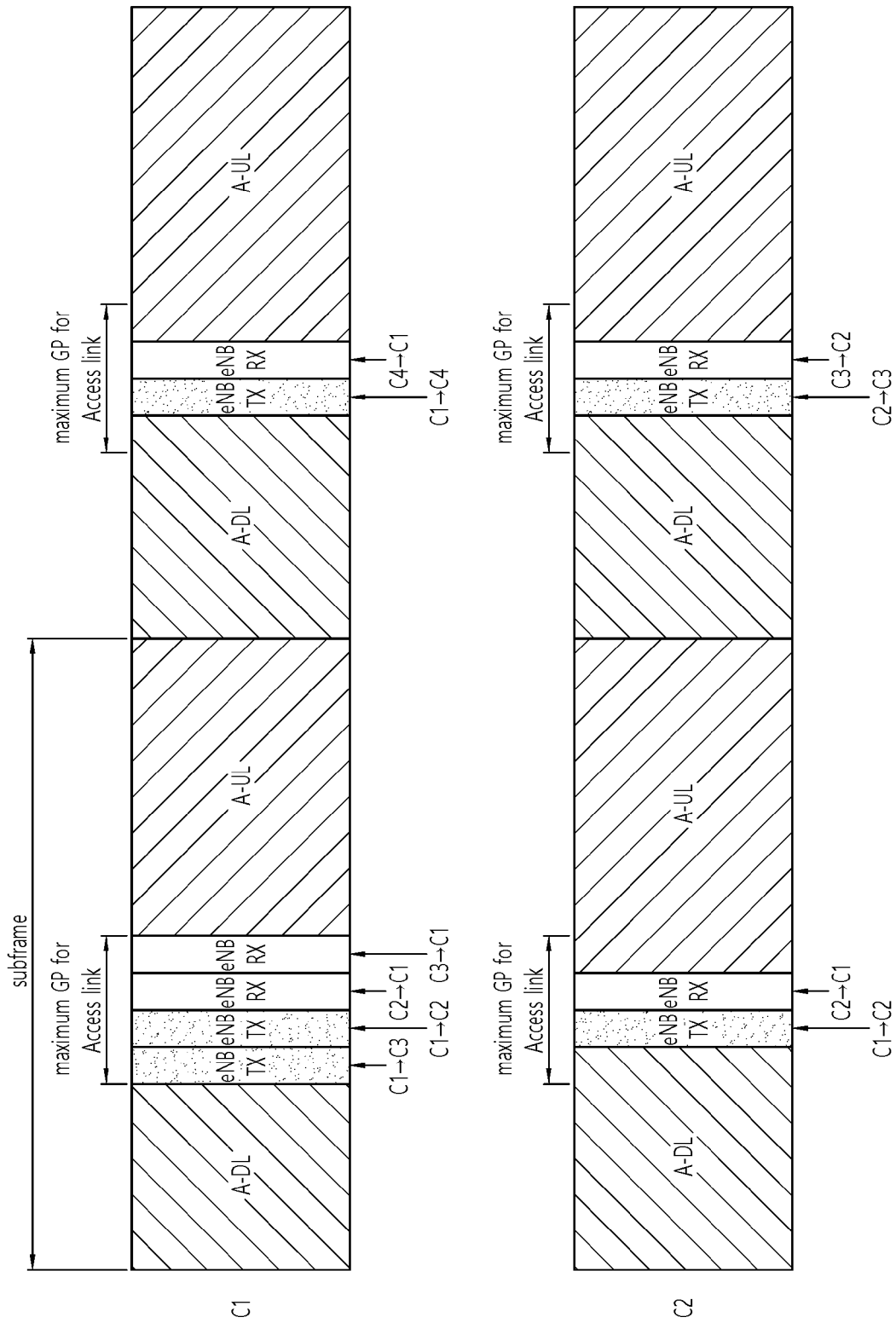

[Fig. 15]
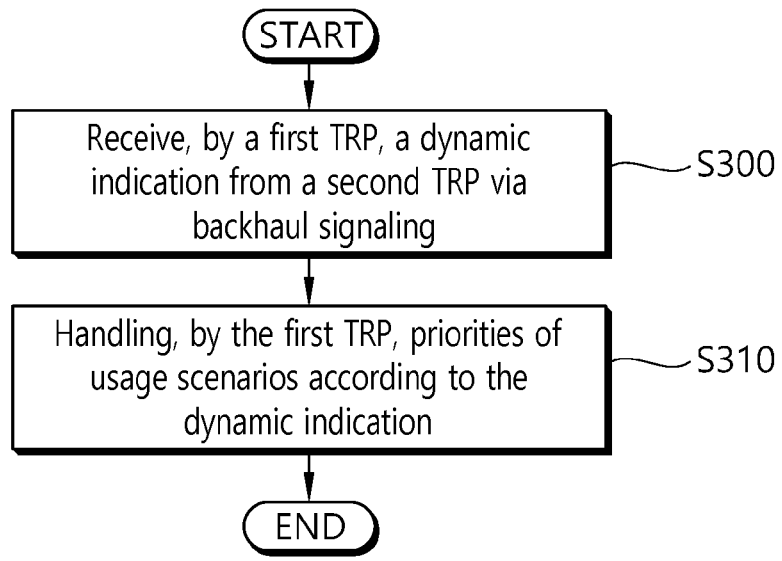
[Fig. 16]
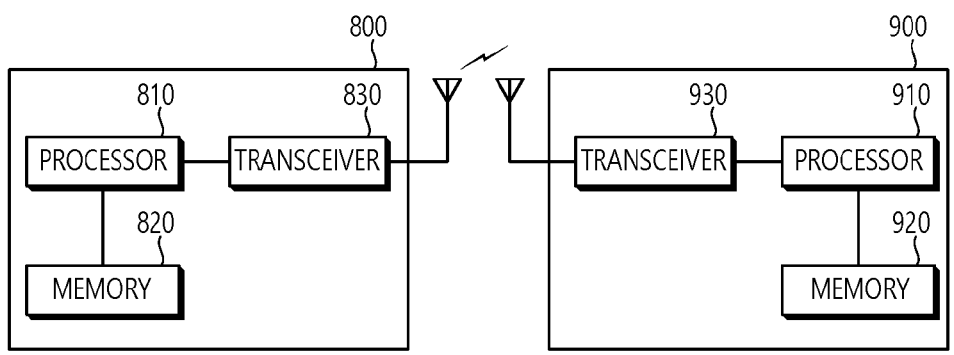

METHOD AND APPARATUS FOR SUPPORTING BACKHAUL SIGNALING MECHANISM FOR NEW RADIO ACCESS TECHNOLOGY IN WIRELESS COMMUNICATION SYSTEM

CROSS-REFERENCE TO RELATED APPLICATIONS

This application is a National Stage application under 35 U.S.C. § 371 of International Application No. PCT/KR2017/006708, filed on Jun. 26, 2017, which claims the benefit of U.S. Provisional Application No. 62/354,115, filed on Jun. 24, 2016. The disclosures of the prior applications are incorporated by reference in their entirety.

TECHNICAL FIELD

The present invention relates to wireless communications, and more particularly, to a method and apparatus for supporting backhaul signaling mechanisms for a new radio access technology (NR) in a wireless communication system.

BACKGROUND ART

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

As more and more communication devices require more communication capacity, there is a need for improved mobile broadband communication over existing radio access technology. Also, massive machine type communications (MTC), which provides various services by connecting many devices and objects, is one of the major issues to be considered in the next generation communication. In addition, communication system design considering reliability/latency sensitive service/UE is being discussed. The introduction of next generation radio access technology considering enhanced mobile broadband communication, massive MTC, ultra-reliable and low latency communication (URLLC) is discussed. This new technology may be called new radio access technology (new RAT or NR) for convenience.

In NR, analog beamforming may be introduced. In case of millimeter wave (mmW), the wavelength is shortened so that a plurality of antennas can be installed in the same area. For example, in the 30 GHz band, a total of 100 antenna elements can be installed in a 2-dimension array of 0.5 lambda (wavelength) intervals on a panel of 5 by 5 cm with a wavelength of 1 cm. Therefore, in mmW, multiple antenna elements can be used to increase the beamforming gain to increase the coverage or increase the throughput.

In this case, if a transceiver unit (TXRU) is provided so that transmission power and phase can be adjusted for each antenna element, independent beamforming is possible for each frequency resource. However, installing a TXRU on all 100 antenna elements has a problem in terms of cost effectiveness. Therefore, a method of mapping a plurality of antenna elements to one TXRU and adjusting the direction of a beam using an analog phase shifter is considered. This analog beamforming method has a disadvantage that it cannot perform frequency selective beaming because it can make only one beam direction in all bands.

A hybrid beamforming with B TXRUs, which is an intermediate form of digital beamforming and analog beamforming, and fewer than Q antenna elements, can be considered. In this case, although there is a difference depending on the connection method of the B TXRU and Q antenna elements, the direction of the beam that can be simultaneously transmitted is limited to B or less.

For operating NR efficiently, various schemes have been discussed.

DISCLOSURE OF INVENTION

Technical Problem

The present provides a method and apparatus for supporting backhaul signaling mechanisms for a new radio access technology (NR) in a wireless communication system. The present invention discusses mechanisms to support backhaul signaling in NR among cells.

Solution to Problem

In an aspect, a method for supporting a backhaul signaling in a wireless communication system is provided. The method includes receiving, by a first transmission and reception point (TRP), a dynamic indication from a second TRP via backhaul signaling, and handling, by the first TRP, priorities of usage scenarios according to the dynamic indication.

In another aspect, a first transmission and reception point (TRP) in a wireless communication system is provided. The first TRP includes a memory, and a processor, coupled to the memory, that receives a dynamic indication from a second TRP via backhaul signaling, and handles priorities of usage scenarios according to the dynamic indication.

Advantageous Effects of Invention

The NR can support backhaul signaling efficiently.

BRIEF DESCRIPTION OF DRAWINGS

FIG. 1 shows a wireless communication system.
FIG. 2 shows structure of a radio frame of 3GPP LTE.
FIG. 3 shows a resource grid for one downlink slot.
FIG. 4 shows an example of subframe type for NR.
FIG. 5 shows an example of a cell layout in NR.
FIG. 6 shows an example of various interface between core network and each TRP.
FIG. 7 shows an example macro RTP assisted dynamic indication according to an embodiment of the present invention.
FIG. 8 shows another example macro RTP assisted dynamic indication according to an embodiment of the present invention.
FIG. 9 shows an example of transmission timing of macro RTP assisted dynamic indication according to an embodiment of the present invention.
FIG. 10 shows an example of shifting subframe boundary among micro TRPs according to an embodiment of the present invention.
FIG. 11 shows an example of a reservation gap according to an embodiment of the present invention.

FIG. 12 shows an example of aligning subframes and DL control location between different micro TRPs according to an embodiment of the present invention.

FIG. 13 shows an example of analog beamforming according to an embodiment of the present invention.

FIG. 14 shows an example of TDM multiplexing of backhaul signaling portion according to an embodiment of the present invention.

FIG. 15 shows a method for supporting a backhaul signaling according to an embodiment of the present invention.

FIG. 16 shows a wireless communication system to implement an embodiment of the present invention.

MODE FOR THE INVENTION

Techniques, apparatus and systems described herein may be used in various wireless access technologies such as code division multiple access (CDMA), frequency division multiple access (FDMA), time division multiple access (TDMA), orthogonal frequency division multiple access (OFDMA), single carrier frequency division multiple access (SC-FDMA), etc. The CDMA may be implemented with a radio technology such as universal terrestrial radio access (UTRA) or CDMA2000. The TDMA may be implemented with a radio technology such as global system for mobile communications (GSM)/general packet radio service (GPRS)/enhanced data rates for GSM evolution (EDGE). The OFDMA may be implemented with a radio technology such as institute of electrical and electronics engineers (IEEE) 802.11 (Wi-Fi), IEEE 802.16 (WiMAX), IEEE 802-20, evolved-UTRA (E-UTRA) etc. The UTRA is a part of a universal mobile telecommunication system (UMTS). 3rd generation partnership project (3GPP) long term evolution (LTE) is a part of an evolved-UMTS (E-UMTS) using the E-UTRA. The 3GPP LTE employs the OFDMA in downlink (DL) and employs the SC-FDMA in uplink (UL). LTE-advance (LTE-A) is an evolution of the 3GPP LTE. For clarity, this application focuses on the 3GPP LTE/LTE-A. However, technical features of the present invention are not limited thereto.

FIG. 1 shows a wireless communication system. The wireless communication system 10 includes at least one evolved NodeB (eNB) 11. Respective eNBs 11 provide a communication service to particular geographical areas 15a, 15b, and 15c (which are generally called cells). Each cell may be divided into a plurality of areas (which are called sectors). A user equipment (UE) 12 may be fixed or mobile and may be referred to by other names such as mobile station (MS), mobile terminal (MT), user terminal (UT), subscriber station (SS), wireless device, personal digital assistant (PDA), wireless modem, handheld device. The eNB 11 generally refers to a fixed station that communicates with the UE 12 and may be called by other names such as base station (BS), base transceiver system (BTS), access point (AP), etc.

In general, a UE belongs to one cell, and the cell to which a UE belongs is called a serving cell. An eNB providing a communication service to the serving cell is called a serving eNB. The wireless communication system is a cellular system, so a different cell adjacent to the serving cell exists. The different cell adjacent to the serving cell is called a neighbor cell. An eNB providing a communication service to the neighbor cell is called a neighbor eNB. The serving cell and the neighbor cell are relatively determined based on a UE.

This technique can be used for DL or UL. In general, DL refers to communication from the eNB 11 to the UE 12, and UL refers to communication from the UE 12 to the eNB 11. In DL, a transmitter may be part of the eNB 11 and a receiver may be part of the UE 12. In UL, a transmitter may be part of the UE 12 and a receiver may be part of the eNB 11.

The wireless communication system may be any one of a multiple-input multiple-output (MIMO) system, a multiple-input single-output (MISO) system, a single-input single-output (SISO) system, and a single-input multiple-output (SIMO) system. The MIMO system uses a plurality of transmission antennas and a plurality of reception antennas. The MISO system uses a plurality of transmission antennas and a single reception antenna. The SISO system uses a single transmission antenna and a single reception antenna. The SIMO system uses a single transmission antenna and a plurality of reception antennas. Hereinafter, a transmission antenna refers to a physical or logical antenna used for transmitting a signal or a stream, and a reception antenna refers to a physical or logical antenna used for receiving a signal or a stream.

FIG. 2 shows structure of a radio frame of 3GPP LTE. Referring to FIG. 2, a radio frame includes 10 subframes. A subframe includes two slots in time domain. A time for transmitting one transport block by higher layer to physical layer (generally over one subframe) is defined as a transmission time interval (TTI). For example, one subframe may have a length of 1 ms, and one slot may have a length of 0.5 ms. One slot includes a plurality of orthogonal frequency division multiplexing (OFDM) symbols in time domain. Since the 3GPP LTE uses the OFDMA in the DL, the OFDM symbol is for representing one symbol period. The OFDM symbols may be called by other names depending on a multiple-access scheme. For example, when SC-FDMA is in use as a UL multi-access scheme, the OFDM symbols may be called SC-FDMA symbols. A resource block (RB) is a resource allocation unit, and includes a plurality of contiguous subcarriers in one slot. The structure of the radio frame is shown for exemplary purposes only. Thus, the number of subframes included in the radio frame or the number of slots included in the subframe or the number of OFDM symbols included in the slot may be modified in various manners.

The wireless communication system may be divided into a frequency division duplex (FDD) scheme and a time division duplex (TDD) scheme. According to the FDD scheme, UL transmission and DL transmission are made at different frequency bands. According to the TDD scheme, UL transmission and DL transmission are made during different periods of time at the same frequency band. A channel response of the TDD scheme is substantially reciprocal. This means that a DL channel response and a UL channel response are almost the same in a given frequency band. Thus, the TDD-based wireless communication system is advantageous in that the DL channel response can be obtained from the UL channel response. In the TDD scheme, the entire frequency band is time-divided for UL and DL transmissions, so a DL transmission by the eNB and a UL transmission by the UE cannot be simultaneously performed. In a TDD system in which a UL transmission and a DL transmission are discriminated in units of subframes, the UL transmission and the DL transmission are performed in different subframes. In a TDD system, to allow fast switching between DL and UL, UL and DL transmission may be performed within a same subframe/slot in time division multiplexing (TDM)/frequency division multiplexing (FDM) manner.

FIG. 3 shows a resource grid for one downlink slot. Referring to FIG. 3, a DL slot includes a plurality of OFDM symbols in time domain. It is described herein that one DL slot includes 7 OFDM symbols, and one RB includes 12 subcarriers in frequency domain as an example. However, the present invention is not limited thereto. Each element on the resource grid is referred to as a resource element (RE). One RB includes 12×7 or 12×14 resource elements. The number NDL of RBs included in the DL slot depends on a DL transmit bandwidth. The structure of a UL slot may be same as that of the DL slot. The number of OFDM symbols and the number of subcarriers may vary depending on the length of a CP, frequency spacing, etc. For example, in case of a normal cyclic prefix (CP), the number of OFDM symbols is 7 or 14, and in case of an extended CP, the number of OFDM symbols is 6 or 12. One of 128, 256, 512, 1024, 1536, 2048, 4096 and 8192 may be selectively used as the number of subcarriers in one OFDM symbol.

5th generation mobile networks or 5th generation wireless systems, abbreviated 5G, are the proposed next telecommunications standards beyond the current 4G LTE/international mobile telecommunications (IMT)-advanced standards. 5G includes both new radio access technology (new RAT or NR) and LTE evolution. Hereinafter, among 5G, NR will be focused. 5G planning aims at higher capacity than current 4G LTE, allowing a higher density of mobile broadband users, and supporting device-to-device, ultra-reliable, and massive machine communications. 5G research and development also aims at lower latency than 4G equipment and lower battery consumption, for better implementation of the Internet of things.

It is expected that different frame structure may be necessary for NR. Particularly, different frame structure in which UL and DL may be present in every subframe or may change very frequently in the same carrier may be necessary for NR. Different application may require different minimum size of DL or UL portions to support different latency and coverage requirements. For example, massive machine-type communication (mMTC) for high coverage case may require relatively long DL and UL portion so that one transmission can be successfully transmitted. Furthermore, due to different requirement on synchronization and tracking accuracy requirements, different subcarrier spacing and/or different CP length may be considered. In this sense, it is necessary to consider mechanisms to allow different frame structures coexisting in the same carrier and be operated by the same cell/eNB.

In NR, utilizing a subframe in which downlink and uplink are contained may be considered. This scheme may be applied for paired spectrum and unpaired spectrum. The paired spectrum means that one carrier consists of two carriers. For example, in the paired spectrum, the one carrier may include a DL carrier and an UL carrier, which are paired with each other. In the paired spectrum, communication, such as DL, UL, device-to-device communication, and/or relay communication, may be performed by utilizing the paired spectrum. The unpaired spectrum means that that one carrier consists of only one carrier, like the current 4G LTE. In the unpaired spectrum, communication, such as DL, UL, device-to-device communication, and/or relay communication, may be performed in the unpaired spectrum.

Further, in NR, the following subframe types may be considered to support the paired spectrum and the unpaired spectrum mentioned above.

(1) Subframes including DL control and DL data
(2) Subframes including DL control, DL data, and UL control
(3) Subframes including DL control and UL data
(4) Subframes including DL control, UL data, and UL control
(5) Subframes including access signals or random access signals or other purposes.
(6) Subframes including both DL/UL and all UL signals.

However, the subframe types listed above are only exemplary, and other subframe types may also be considered.

FIG. 4 shows an example of subframe type for NR. The subframe shown in FIG. 4 may be used in TDD system of NR, in order to minimize latency of data transmission. Referring to FIG. 4, the subframe contains 14 symbols in one TTI, like the current subframe. However, the subframe includes DL control channel in the first symbol, and UL control channel in the last symbol. The remaining symbols may be used for DL data transmission or for UL data transmission. According to this subframe structure, DL transmission and UL transmission may sequentially proceed in one subframe. Accordingly, DL data may be transmitted in the subframe, and UL acknowledgement/non-acknowledgement (ACK/NACK) may also be received in the subframe. In this manner, the subframe shown in FIG. 4 may be referred to as self-contained subframe. As a result, it may take less time to retransmit data when a data transmission error occurs, thereby minimizing the latency of final data transmission. In the self-contained subframe structure, a time gap may be required for the transition process from the transmission mode to the reception mode or from the reception mode to the transmission mode. For this purpose, some OFDM symbols at the time of switching from DL to UL in the subframe structure may be set to the guard period (GP).

FIG. 5 shows an example of a cell layout in NR. In NR, various cell layouts may be considered. Referring to FIG. 5, the cell layout consists of a macro layer and a micro layer. The macro layer is provided by the macro Tx/Rx point (TRP), and is an overlaid layer providing coverage. The micro layer is provided by the micro TRP, and may provide data boosting and data layer. The macro TRP and micro TRP may present in the co-channel or different channel. In terms of data between core network and each TRP, unless noted otherwise, separate channel/interface may be used to deliver data between core network and each TRP.

FIG. 6 shows an example of various interface between core network and each TRP. Referring to FIG. 6, the data path delivers data between the core network (e.g. gateway) and each TRP. The backhaul link is necessary to exchange any message between TRPs. The access link is a data path between TRP and UE. One simple approach of backhaul link may be to utilize data path from the gateway. In other words, data path and backhaul link may be the same physically.

In the present invention, it is focused on mechanism(s) to support interface for backhaul signaling between TRPs. If there is additional interface for backhaul signaling and/or data forwarding between TRPs and/or between TRP and core network, that interface may be used in addition to the mechanism provided in the present invention. More specifically, the present invention discusses mechanisms to support fast and dynamic backhaul signaling. Depending on the cases, backhaul signaling may include data forwarding path as well. Unless noted otherwise, the present invention focusses on cases where data path from core network and backhaul link is different from each other.

To support efficient inter-cell interference and handling different priorities of each resource or usage scenarios utilizing a specific resource, dynamic indication among different cells may be introduced. In the present invention, particularly focusing on dynamic indication support among micro TRPs, mechanisms of dynamic indication are discussed.

Dynamic indication may include at least one of the followings:
- Subframe type or DL/UL configuration: This indication may be transmitted in every subframe or in a subframe group (i.e. multiple subframes). If there are multiple DL/UL configuration per subband, multiple DL/UL configuration or subframe type may be indicated.
- Intended TX/RX burst length or gap length or blank resources: Further details on resources which are reserved or used for TX/RX burst may also be indicated in addition to DL/UL configuration.
- Scheduling information for all or specific UEs. For example, scheduling information for UEs requiring high reliable traffic or very high data rate which requires some protection may be indicated.
- Numerology used in a resource set with a set of frequency/time resource
- Data forwarding (particularly in case that system frame number (SFN) type of transmission is used or data path setup (DPS) data forwarding is used or data relay is used)

Hereinafter, various embodiments of the dynamic indication according to embodiments of the present invention are described.

1. Macro TRP Assisted Dynamic Indication

When there is always macro TRP overlaid over multiple micro TRPs, as shown in FIG. 5, macro TRP may be utilized for dynamic indication. In this case, it may be assumed that each micro TRP is equipped with TX/RX in macro TRP. Each micro TRP may be handled similar to a UE from a macro TRP perspective. In other words, each micro TRP may be scheduled by macro TRP via regular scheduling procedure. In terms of scheduling method, at least one of the following approaches may be considered.

(1) Each micro TRP may transmit backhaul data to the macro TRP when UL grant is received or in the resources configured for semi-static transmission resources, and each micro TRP may listen backhaul from another TRP or other TRPs based on DL scheduling. DL transmission may be done via multicast or via unicast. In case of multicast, single-cell point-to-multipoint (SC-PTM) type of operation may be used, and SC-PTM configuration may not be necessary by higher layer, though each micro TRP is configured with SC-PTM configuration including potential resources, radio network temporary identity (RNTI), etc. When this approach is used, each micro TRP transmits backhaul data in UL resources of macro TRP and receive backhaul data in DL resources of macro TRP.

FIG. 7 shows an example macro RTP assisted dynamic indication according to an embodiment of the present invention. Referring to FIG. 7, in step S100, the micro TRP A transmits a scheduling request (SR) to the macro TRP. In step S110, macro TRP transmits a UL grant to the micro TRP A. In step S120, the micro TRP A transmits a backhaul data to the macro TRP by using resources indicated by the UL grant. In step S130, the macro TRP transmits the relayed backhaul data to other micro TRPs.

(2) Each micro TRP may transmit backhaul data when UL grant is received. The UL grant may be multicast to multiple micro TRPs, and the UL grant may include a token which defines who the transmitter TRP is. Based on the UL grant, the transmitter TRP transmits backhaul signaling, and other micro TRPs may listen on UL spectrum. By this way, macro TRP does not need to forward/relay backhaul data. The macro TRP may only offer UL resources for backhaul signaling exchange. If this approach is used, for micro TRP, receiving module in UL spectrum may be needed in addition to transmission. If this approach is used, time division multiplexing (TDM) approach between transmission and reception may be considered.

If backhaul signaling exists between TRPs, acknowledgement procedure may be considered. The UL grant may also schedule resource for HARQ-ACK feedback for the destination TRP. Or, backhaul signaling may be transmitted without relying on HARQ-ACK procedure. If HARQ-ACK is used, when NACK is sent by the destination TRP, macro TRP may schedule successive UL grant for retransmission based on overhearing/hearing the NACK transmission.

FIG. 8 shows another example macro RTP assisted dynamic indication according to an embodiment of the present invention. Referring to FIG. 8, in step S200, the micro TRP A transmits a SR to the macro TRP. In step S210, macro TRP transmits a UL grant to multiple micro TRPs, i.e. micro TRPs A/B. In step S220, the micro TRP A transmits a backhaul data to the micro TRP B by using resources indicated by the UL grant. In step S230, the micro TRP transmits ACK/NACK signal to the micro TRP A as a response to the backhaul data. If NACK signal is received, in step S240, the micro TRP A transmits a retransmission to the micro TRP B.

(3) The macro TRP may reserve some UL resource for backhaul signaling exchange. For example, a semi-persistent scheduling (SPS) resource may be configured by the macro TRP which is then informed to each micro TRP. Each micro TRP may utilize the resource for backhaul transmission based on potential contention. Each TRP may listen on the configured resource for potential backhaul message(s).

(4) The macro TRP may reserve resource for each micro TRP for backhaul signaling exchange. The resource may be shared between backhaul link and access link of macro TRP. Also, the same resource may be configured between micro TRPs which are not required to communicate each other (e.g. due to long communication range). Other TRPs may listen on the configured resource for potential backhaul signaling reception from the TRP.

Similar mechanisms described above may be applied for the case where overlaid macro TRP is not available and thus coordination among micro TRPs is assumed. In such a case, each source TRP may behave like the macro TRP or there may be one or more TRPs operating macro TRP functionalities mentioned in the present invention. For example, if micro TRPs are operating without overlaid macro TRP for backhaul signaling, each micro TRP may configure the resource for backhaul signaling to/from itself, and other TRPs may follow the configuration by each TRP for backhaul signaling exchange.

Hereinafter, further details to support the approach (1) described above are described. For the basic mechanism, a micro TRP may transmit a control message which includes dynamic indication to both micro TRP and macro TRP. The timing may or may not be concurrent. Also, the dynamic indication may occur once or multiple times per subframe of micro TRP. Also, to minimize the overhead in macro TRP, the dynamic indication may be transmitted only once per subframe of macro TRP.

It may be assumed that macro TRP's default subcarrier spacing is SC0 and micro TRP's default subcarrier spacing is SC1 (e.g. SC0=15 kHz, SC1=60 kHz). When the dynamic indication is transmitted via macro TRP, it may be desirable to utilize the macro TRP's default subcarrier spacing. However, if the overhead is too high by utilizing macro TRP's subcarrier spacing, it may be further considered to use different subcarrier spacing (which may not be equal to SC0 nor SC1) for signaling between micro and macro TRPs.

If SC0 is used for the dynamic indication, the timing difference between two layers should be considered. It may be assumed that a subframe of micro TRP is same as a mini-subframe of macro TRP (in terms of time duration). In other words, the dynamic indication from micro TRP in each subframe may be transmitted in a mini-subframe of macro TRP.

FIG. 9 shows an example of transmission timing of macro RTP assisted dynamic indication according to an embodiment of the present invention. Referring to FIG. 9, when a subframe of micro TRP is same as a mini-subframe of macro TRP, the dynamic indication from micro TRP in each subframe may be transmitted in a mini-subframe of macro TRP.

The dynamic indication from a micro TRP to a macro TRP may be an intended configuration/scheduling rather than actual configuration/scheduling. Based on intended configuration/scheduling of neighbor cells, final/actual scheduling/configuration may change. For supporting the dynamic indication from micro TRPs, SPS resource to each micro TRP may be configured for both DL and UL. If each TRP does not have any indication to transmit, the SPS resource may be skipped. Based on the received indication from micro TRPs, macro TRP may either relay the transmission (assuming transmission from each micro has its intended receiver already) or may process the received information, and generate necessary indication based on the indications. For example, if micro TRP A which is a neighbor of micro TRP B intends to utilize high reliable data reception/transmission in a certain resource, macro TRP may indicate to micro TRP B to reduce or minimize the transmission in the intended resource for protection. Furthermore, this may be useful to handle different timing of the scheduling. For example, if a micro TRP intends to schedule high-power or high-reliable data transmission in subframe n+k (the current subframe is n), the macro TRP may indicate the information to other micro TRPs at subframe n+k−1 instead of n. Alternatively, each TRP may indicate the information only one subframe before the scheduling/application of the configuration. To minimize the overhead of backhaul signaling, some joint coding or aggregated manner of signaling may be considered. For example a bitmap of a frequency or RB may be used, and each micro TRP may set flag in each bit if the corresponding RB requires some protection or operates in different manner.

If the dynamic indication from a micro TRP occurs more than once per subframe of micro TRP, due to different timing between macro and micro TRPs, it may not be possible to transmit the dynamic indication at macro TRP. In such a case, additional indication at micro TRP may be considered, or aggregated indication at macro TRP may be considered.

More specifically, some immediate backhaul signaling, which potentially includes data, may be discussed. For example, if a micro TRP has any urgent data transmission, the micro TRP may indicate the urgency to its neighboring micro TRPs so that other micro TRPs may either stop or reduce the power to reduce the interference or may perform SFN transmission to improve reliability. For this, at least one of the following procedure may be considered.

When a micro TRP needs to schedule an urgency data, the micro TRP may dynamically indicate the scheduling information to its neighboring micro TRPs via backhaul signaling procedure. When the latency to forward backhaul signaling is L, then the overall scheduling latency for the urgent data may be increased by L.

If single transmission of urgent data is assumed, neighboring micro TRPs may reduce transmission power or minimize transmission on the indicated resource or may perform SFN transmission in case of DL transmission. In case of UL reception, it becomes challenging to stop UE transmission. Thus, depending on the budget to the actual UL transmission of urgent data, other micro TRPs may stop UL transmission which is already granted.

In case of repeated transmission, the backhaul signaling may be forwarded simultaneously with urgent data scheduling. In such a case, there may be limited coordination/collaboration among micro TRPs in the first/initial transmission. Once the backhaul signaling is received, each micro TRP may perform behavior similar to the above case which can enhance the reliability of the second transmission (or repeated transmission).

Alternatively, backhaul signaling of urgent data may be transmitted simultaneously with data scheduling so that other neighboring micro TRPs may perform necessary data recovery. For this approach, one approach to enhance the reliability of urgent/reliable data may be to utilize very high power which then impact/increase interference level on neighboring micro TRPs. Once the scheduling is achieved, the information may be forwarded to neighboring micro TRPs so that neighboring micro TPRs may initiate any recovery procedure on the potential OFDM symbols/duration where sudden/high interference level.

In case of very urgent/short transmission/scheduling case, to minimize the latency via macro TRP, it may be desirable to forward backhaul signaling via one or a few OFDM symbols of macro TRP.

2. Without Macro TRP Assisted Dynamic Indication (Micro TRP has Multiple Frequencies)

The dynamic indication among micro TRPs nay be supported by utilizing micro TRP's frequency(s). It may be assumed that each micro TRP supports multiple frequencies which then can allow simultaneous transmission and reception at each micro TRP. This may further requires coordination in terms of resource allocation. For example, each micro TRP may support paired spectrum. For another example, each micro TRP may support multiple unpaired spectrum. Basic mechanism of the dynamic indication among multiple micro TRPs when each micro TRP has multiple frequencies may be as follows.

Each micro TRP may broadcast its intended resource for backhaul signaling reception. In the broadcasted resource, the micro TRP may be assumed to be in reception mode. However, the resource may be also scheduled to UEs, thus, multiplexing between access link (UL) and backhaul link (reception) may be supported.

If a micro TRP A has any information to transmit to another micro TRP B, the micro TRP A may transmit its message at the configured resource by the micro TRP B.

If there are multiple micro TRPs simultaneously transmitting messages to the same micro TRP, contention may be allowed. Collision avoidance may be done via sensing or via utilizing different reference signal (RS) scrambling or reservation.

The resource may be configured separately per each micro TRP or common for all neighboring micro TRPs. If common resource is assumed, the common resource may be configured by the overlaid macro TRP or by core network entity. Time synchronization reference of common resource may be either based on the overlaid macro TRP or based on global positioning system (GPS) timer or by external synchronization source. If each micro TRP configures resource, the timing of each micro TRP's resource may be timing of the configuring micro TRP or overlaid macro TRP or external source or GPS. At least when backhaul signaling is performed via air interface, tight synchronization may be assumed among micro TRPs.

At least, demodulation RS (DM-RS) scrambling identity or RNTI may be configured separately per each micro TRP even though the resource itself may be shared among neighboring cells. Furthermore, if analog beamforming is used, beam direction may also be configured separately per each micro TRP.

Generally, direct communication or sidelink operation may be used between micro TRPs for backhaul signaling exchange and discovery signal and/or synchronization signal may not be necessary. In this case, the resource may be configured by each micro TRP or the overlaid macro TRP.

Alternatively, each micro TRP may indicate the resource which will be used for transmission of any backhaul signaling which can be heard by neighboring micro TRPs.

Alternatively, instead of utilizing separate backhaul signaling, the control information at least destined to a set of UEs from a micro TRP may be overheard. To assist this type of operation, each micro TRP may define control region which may not overlap among neighboring micro TRPs. For example, if control region is assumed as the first OFDM symbol of each subframe, each micro TRP may shift the subframe boundary so that control region among neighboring cells do not collide with each other.

FIG. 10 shows an example of shifting subframe boundary among micro TRPs according to an embodiment of the present invention. Referring to FIG. 10, the control region of micro TRP 1/2 is assumed as the first OFDM symbol of each subframe. Further, the control region of micro TRP 3/4 is assumed as the second OFDM symbol of each subframe, by shifting. Further, the control region of micro TRP 5/6 is assumed as the third OFDM symbol of each subframe by shifting. It may be assumed that interference between micro TRPs 3/4 is not significant, thus, signaling between micro TRPs 3/4 may not be assumed in this embodiment. With this approach, each micro TRP may listen on neighboring micro TRP's control channel which may include information for dynamic signaling such as DL/UL subframe type, etc. If separate frequency is used between DL and UL, if control channel is transmitted in DL spectrum, it may be assumed that each micro TRP has also receiver on DL spectrum for overhearing.

The subframe shift may be defined by each micro TRP and may be announced to its neighbor micro TRPs or may be recommended by neighboring micro TRPs. Each micro TRP may or may not listen on control region of neighboring micro TRPs to minimize service interruption.

Alternatively, to minimize the impact on DL spectrum, if TRP layer has paired spectrum, the control message may also be broadcasted in UL spectrum (the same time location to DL spectrum), and each micro TRP may listen on UL spectrum for neighboring micro TRP's control information. While listening on UL spectrum of neighboring micro TRP, UL transmission from access link may be stopped or dropped. This information may be considered in UL scheduling for access link beforehand. Alternatively, if a micro TRP A has any information to transmit to neighboring micro TRP B, the micro TRP A may transmit its backhaul signaling in micro TRP B's UL spectrum so that micro TRP B can listen on. This may corrupt on-going access link UL transmission, thus, only essential or urgent backhaul signaling may be transmitted via this mechanism.

Similar to urgent UL transmission, if backhaul signaling is critical and may require higher priority over normal data transmission, the backhaul signaling may be transmitted with higher power compared to normal data transmission. The network may assume that there may be interruption by neighboring micro TRP's on UL reception so that it will try to decode backhaul signaling. For data decoding of backhaul data, necessary information, such as RNTI used, RB index, etc., may be rather preconfigured or known in advance so that the receiving micro TRP knows the information a prior. This may be viewed as if the intended receiving micro TRP configures potential UL resources for backhaul message transmission which may be shared with access link. In case of backhaul signaling, it may override the access link transmission.

Alternatively, each micro TRP may be configured as if a connected UE for each micro TRP assuming that control message of neighboring micro TRP can be heard by other micro TRPs. For example, each micro TRP may configure cell RNTI (C-RNTI) or ID to each intended neighboring micro TRP for backhaul message exchange, and may schedule any DL or UL for each neighboring micro TRP (multicast may also be considerable by utilizing SC-PTM). This approach is similar to the approach with overlaid macro TRP. When one micro TRP schedules DL for another micro TRP, the destination micro TRP may listen on DL transmission. DL transmission may be done at destination micro TRP's UL spectrum to minimize the interruption. Alternatively, it may be done at sender micro TRP's DL spectrum where actual transmission may occur in next TTI/subframe or in a few subframes to allow destination micro TRP preparation for data reception (i.e. to avoid conflicting scheduling). The same approach may be applied to "3. Without macro TRP assisted dynamic indication (micro TRP has single unpaired spectrum)", which will be described below, as well.

3. Without Macro TRP Assisted Dynamic Indication (Micro TRP has Single Unpaired Spectrum)

Similar to "2. Without macro TRP assisted dynamic indication (micro TRP has multiple frequencies)" described above, for one approach, TX resources and RX resources for backhaul signaling may be defined so that each micro TRP can know where to transmit and when to receive. However, this approach generate unnecessary interruption of data transmission/reception to/from access link or UE. Accordingly, for another approach, some gap to indicate whether there is any backhaul signaling transmission in the following subframe or mini-subframe may be utilized. For example, if a subframe-based signaling is used, a gap may be reserved in each subframe. In the gap, a micro TRP which has any backhaul signaling may transmit reservation signal.

FIG. 11 shows an example of a reservation gap according to an embodiment of the present invention. Referring to FIG. 11, a reservation gap is reserved in each subframe in order to indicate whether there is any backhaul signaling transmission in the following subframe or mini-subframe. A micro TRP which has any backhaul signaling may transmit reservation signal in the reservation gap.

In the reservation gap, a micro TRP intending to transmit a backhaul signalling in the corresponding subframe may transmit reservation signal or backhaul intention signal. Micro TRPs received/detected the reservation signal may listen on backhaul signal in the corresponding subframe. Subset of OFDM symbols in a subframe may carry backhaul signalling, and there may be collisions in the reservation signals. When each micro TRP detects a certain energy, it may prioritize backhaul signalling over access link scheduling. Thus, this signalling may be used only when urgent backhaul signalling is necessary.

Alternatively, the reservation gap may be utilized to indicate a certain message. When each micro TRP detects the reservation signal, it may perform predefined behaviour. For example, the reservation gap may be utilized for indicating the presence of ultra-reliable and low latency communication (URLLC) traffic in the corresponding subframe. By detecting the reservation signal, neighboring micro TRP may reduce or stop DL and/or UL transmission. To minimize the blocking, the reservation gap/signal may be present in every mini-subframe instead of per subframe. Mini-subframe can consists of "K" number of OFDM symbols which corresponds to 2 OFDM symbols for 15 kHz subcarrier spacing (i.e. 4 OFDM symbols for 30 kHz subcarrier spacing, 8 OFDM symbols for 60 kHz subcarrier spacing).

To create a reservation gap, one of the following approaches may be considered.

16 Ts for 15 kHz subcarrier spacing (~0.51 us) of 0.5 ms may be used for multiple reservation gaps in every 0.5 ms or may be used for the first reservation gap of each 0.5 ms.

(partial or full) CP of an OFDM symbol may be used for reservation gap

If the reservation signal is used for indicating the presence of backhaul signaling, each micro TRP may listen on backhaul signaling for the corresponding subframe or mini-subframe. If a micro TRP listens on backhaul signaling, it may mean that DL transmission may be dropped at least in the OFDM symbols used for backhaul signalling listening. Thus, it may also be recommended that a UE also listens on reservation signals so that if there is reservation signal detected, that data may be skipped/dropped on the corresponding subframe/mini-subframe for the backhaul transmission duration. For this, backhaul transmission duration may be indicated to the UEs as well.

Another approach is to utilize overhearing mechanism mentioned above. In case of unpaired spectrum, that each micro TRP may be on listening or UL mode at the time when it listens on neighboring micro TRP's control messages. To support this, at least in case where potential backhaul or overhearing of control message is considered, the portion may be used for UL in unpaired spectrum. To minimize the necessary gap between DL and UL switching, it may be considered to place control channel in different position (e.g. DL control in the first OFDM symbol or in the last OFDM symbol). To minimize the interference on a micro TRP's UL transmission, FDM and/or spatial domain multiplexing between DL control of micro TRP A and UL transmission of micro TRP B may be considered.

FIG. 12 shows an example of aligning subframes and DL control location between different micro TRPs according to an embodiment of the present invention. Referring to FIG. 12, between different micro TRPs, aligning of subframe and location of DL control may be changed. FIG. 12-(a) shows a case that guard period is configured as 1 OFDM symbol. FIGS. 12-(b) and (c) shows a case that guard period (GP) is not configured. That is, GP needed for DL/UL switching (assuming timing advance (TA) for backhaul transmission is zero) is zero or can be absorbed by CP, FIG. 12-(b) or (c) may be considered. In FIG. 12-(b), control region of each micro TRP may be placed in different location which can be UL portion in neighboring micro TRPs. In FIG. 12-(c), one OFDM symbol (or X OFDM symbol used for control region) may be punctured or not used for any DL/UL transmission. If GP is needed in the region, GP may be used where the network can listen on neighboring micro TRPs control transmission. To determine whether to shift subframe or puncture in some OFDM symbol(s), each micro TRP may broadcast its intended control region (desirably only one OFDM symbol) and its intended UL region where control message overhearing for neighboring micro TRP is expected (e.g. for micro TRPs 3/4 in FIG. 12-(c), first OFDM symbol for control region and the last OFDM symbol for reception with one OFDM symbol shifted). Based on the intended configuration, neighboring micro TRP may determine its OFDM symbol location for control region and overhearing OFDM symbol. The coordination may be done via the overlaid macro TRP. If micro TRP decides to puncture one or a few OFDM symbol for overhearing, it may indicate to the UEs (in case of DL transmission) so that a UE knows that the OFDM symbol has been punctured for DL transmission. In case of UL, the OFDM symbol may not be punctured. More specifically, the punctured OFDM symbol(s) for DL transmission may be indicated to UEs.

Another approach is to utilize UE for each micro TRP. For each pair of micro TRP A and B, it is possible to configure one or a few UEs which can relay data between micro TRP A and B. Based on UE measurement, the selection of such UEs may be performed at the network. For UEs selected for relaying backhaul signaling between micro TRPs, a UE may be configured with coordinated multi-point (CoMP) like operation where the UE is expected to decode control channels from both micro TRPs. For each micro TRP, at least one UE may be assigned and the assigned UE may forward message from another micro TRP to the serving micro TRP. The detailed scenario may be as follows.

Let's assume that serving micro TRP of a UE 1 is micro TRP A, and UE 1 is assigned to relay data from micro TRP B to micro TRP A.

UE 1 listens on micro TRP A and micro TRP B control region. To minimize relay by UEs, it control region between micro TRP A and micro TRP B may be staggered by shifting subframe boundary. For example, micro TRP A's subframe boundary may be one OFDM symbol left shifted compared to micro TRP B's subframe boundary.

Micro TRP B may assign either new C-RNTI for UE1 or utilize the same C-RNTI for backhaul message.

Micro TRP B transmits backhaul signaling scrambled with UE1's C-RNTI for backhaul message from micro TRP B to micro TRP A.

When UE 1 is on UL transmission, it means that micro TRP A is in UL reception, thus backhaul signaling from micro TRP B may be overheard by micro TRP A. Thus UE 1 does not need to perform anything.

When UE 1 is on DL reception, it may hear micro TRP B's control message, and if there is control message from micro TRP B to UE1, it relays the message to micro TRP A via UL transmission.

To perform UL transmission, either regular UL procedure is used, or semi-statically configured resource may be used.

Alternatively, it may indicate the presence of backhaul message arrival so that micro TRP A may schedule UL grant via SR resource or any configured resource for backhaul message indication.

4. Dynamic Backhaul Indication in Case of Analog Beam Forming is Used

FIG. 13 shows an example of analog beamforming according to an embodiment of the present invention. When analog beam is used, utilizing overhearing mechanism may not work very well, since the transmit beam to certain UEs may not be aligned with neighboring micro TRP's reception direction. For example, in FIG. 13, if C1 wants to transmit urgent data towards UE4 but UE4 may get interference from both C1 and C3, so beam direction towards UE4 may not be easily overheard by C1. If a micro TRP can perform FDM between two different beam directions, concurrent transmission of control channel may be considered. Alternatively, explicit backhaul signaling portion may be configured in a TDM manner (but FDM is not excluded).

FIG. 14 shows an example of TDM multiplexing of backhaul signaling portion according to an embodiment of the present invention. By utilizing maximum GP for access link (where the actual GP length may be dynamically configurable by scheduling of DL and/or UL), communication between backhaul links may be achieved. In FIG. 14, four possible backhaul transmission instances may be available in a subframe. In this case, a potential mechanism to utilize backhaul signaling among micro TRPs may be as follows.

C1: C1->C3, C1->C2, C2->C1, C3->C1 in first subframe, empty, C1->C4, C4->C1, empty in second subframe C2: empty, C1->C2, C2->C1, empty in first subframe, empty, C2->C3, C3->C2 empty in second subframe C3: C1->C3, empty, empty, C3->C1 in first subframe, empty, C2->C3, C3->C3, empty in second subframe C4: empty, empty, empty, empty in first subframe, empty, C1->C4, C4->C1, empty in second subframe For better coordination, the direction and timing may be coordinated by an overlaid macro TRP. This approach may be used in conjunction with overhearing mechanism where subframe boundary of each TPR may be shifted by one OFDM symbol to be able to listen on neighboring micro TRP's transmission.

5. Data Forwarding (Gateway to Backhaul & Access Link)

The same link may be shared between backhaul and access link, particularly, for delivering data from core network to eNB and eNB to UE(s). In such a case, the communication between a gateway to an eNB, and an eNB to a UE need to be shared in the same link. For one approach, TDM between access link and communication between a gateway to an eNB may be configured. Based on this, still backhaul link may be shared with either access link or data link from a gateway to eNB(s)). In such a case, it may be viewed as if each micro TRP is a relay whereas the gateway is one eNB from the access perspective. For another approach, a mechanism of UE relay in device-to-device communication may be utilized, where each micro TRP relays the data from/to a gateway to UEs.

FIG. 15 shows a method for supporting a backhaul signaling according to an embodiment of the present invention. The present invention described above may be applied to this embodiment.

In step S300, the first TRP receives a dynamic indication from a second TRP via backhaul signaling. In step S310, the first TRP handles priorities of usage scenarios according to the dynamic indication. The dynamic indication may include at least one of a subframe type, DL/UL configuration, an intended TX/RX burst length, a gap length, blank resources, scheduling information for all or specific UEs, a numerology used in a resource set, or information on data forwarding.

The dynamic indication may be received with assist of a macro TRP. The receiving the dynamic indication may comprise receiving the dynamic indication which is relayed by the macro TRP. Alternatively, the receiving the dynamic indication may comprise receiving an UL grant from the macro TRP, and receiving the dynamic indication from the second TRP by using resources indicated by the UL grant. Alternatively, the receiving the dynamic indication may comprise receiving the dynamic indication by using SPS resources configured by the macro TRP. Alternatively, the receiving the dynamic indication comprises receiving the dynamic indication by using resources shared between a backhaul link and an access link of the macro TRP.

Alternatively, the dynamic indication may be received without assist of a macro TRP. The receiving the dynamic indication may comprise broadcasting an intended resource for backhaul signaling reception, and receiving the dynamic indication by using the intended resource. The intended resource may be configured separately per each TRP or is configured common for all TRPs. A subframe boundary of the first TRP may be shifted by one OFDM symbol from a subframe boundary of the second TRP. A control region of the first TRP may not overlap with a control region of the second TRP.

Alternatively, the dynamic indication may be received with an analog beamforming. An explicit backhauling signaling portions may be multiplexed by TDM.

FIG. 16 shows a wireless communication system to implement an embodiment of the present invention.

A first TRP 800 includes a processor 810, a memory 820 and a transceiver 830. The processor 810 may be configured to implement proposed functions, procedures and/or methods described in this description. Layers of the radio interface protocol may be implemented in the processor 810. The memory 820 is operatively coupled with the processor 810 and stores a variety of information to operate the processor 810. The transceiver 830 is operatively coupled with the processor 810, and transmits and/or receives a radio signal.

A second TRP 900 includes a processor 910, a memory 920 and a transceiver 930. The processor 910 may be configured to implement proposed functions, procedures and/or methods described in this description. Layers of the radio interface protocol may be implemented in the processor 910. The memory 920 is operatively coupled with the processor 910 and stores a variety of information to operate the processor 910. The transceiver 930 is operatively coupled with the processor 910, and transmits and/or receives a radio signal.

The processors 810, 910 may include application-specific integrated circuit (ASIC), other chipset, logic circuit and/or data processing device. The memories 820, 920 may include read-only memory (ROM), random access memory (RAM), flash memory, memory card, storage medium and/or other storage device. The transceivers 830, 930 may include baseband circuitry to process radio frequency signals. When the embodiments are implemented in software, the techniques described herein can be implemented with modules (e.g., procedures, functions, and so on) that perform the functions described herein. The modules can be stored in memories 820, 920 and executed by processors 810, 910. The memories 820, 920 can be implemented within the processors 810, 910 or external to the processors 810, 910 in which case those can be communicatively coupled to the processors 810, 910 via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope of the present disclosure.

The invention claimed is:

1. A method for supporting a backhaul signaling in a wireless communication system, the method comprising:
   receiving, by a first transmission and reception point (TRP), a dynamic indication from a second TRP via backhaul signaling; and
   handling, by the first TRP, priorities of usage scenarios according to the dynamic indication,
   wherein the dynamic indication is received with assist of a macro TRP.

2. The method of claim 1, wherein the dynamic indication includes at least one of a subframe type, downlink/uplink (DL/UL) configuration, an intended transmission/reception (TX/RX) burst length, a gap length, blank resources, scheduling information for all or specific user equipments (UEs), a numerology used in a resource set, or information on data forwarding.

3. The method of claim 1, wherein receiving the dynamic indication comprises receiving the dynamic indication by using resources shared between a backhaul link and an access link of the macro TRP.

4. The method of claim 1, wherein receiving the dynamic indication comprises receiving the dynamic indication which is relayed by the macro TRP.

5. The method of claim 1, wherein receiving the dynamic indication comprises:
   receiving an uplink (UL) grant from the macro TRP; and
   receiving the dynamic indication from the second TRP by using resources indicated by the UL grant.

6. The method of claim 1, wherein receiving the dynamic indication comprises receiving the dynamic indication by using semi-persistent scheduling (SPS) resources configured by the macro TRP.

7. The method of claim 1, wherein receiving the dynamic indication comprises:
   broadcasting an intended resource for backhaul signaling reception; and
   receiving the dynamic indication by using the intended resource.

8. The method of claim 7, wherein the intended resource is configured separately per each TRP or is configured common for all TRPs.

9. The method of claim 7, wherein a subframe boundary of the first TRP is shifted by one orthogonal frequency division multiplexing (OFDM) symbol from a subframe boundary of the second TRP.

10. The method of claim 9, wherein a control region of the first TRP does not overlap with a control region of the second TRP.

11. The method of claim 1, wherein the dynamic indication is received with an analog beamforming.

12. The method of claim 11, wherein an explicit backhauling signaling portions is multiplexed by time division multiplexing (TDM).

13. A first transmission and reception point (TRP) in a wireless communication system, the first TRP comprising:
   a memory; and
   a processor, coupled to the memory, that:
   receives a dynamic indication from a second TRP via backhaul signaling, and
   handles priorities of usage scenarios according to the dynamic indication,
   wherein the dynamic indication is received with assist of a macro TRP.

* * * * *